United States Patent [19]
Clark

[11] 3,754,151
[45] Aug. 21, 1973

[54] THERMAL MOTOR AND GENERATOR
[76] Inventor: Robert O. Clark, 11916 El Solindo N.E., Albuquerque, N. Mex. 87111
[22] Filed: Sept. 20, 1972
[21] Appl. No.: 290,722

[52] U.S. Cl. .......................... 290/1, 310/4 A, 60/10, 60/23
[51] Int. Cl. ............................................ H02p 9/04
[58] Field of Search ................... 310/4, 4 A; 60/23, 60/10; 290/1; 318/117; 322/2

[56] References Cited
UNITED STATES PATENTS

| | | | |
|---|---|---|---|
| 984,579 | 2/1911 | Marti | 60/23 |
| 1,804,709 | 5/1931 | Shoenberg | 310/4 A |
| 2,878,641 | 3/1959 | Decker | 60/10 |
| 3,229,177 | 1/1966 | Clarke | 318/117 |
| 3,316,415 | 4/1967 | Taylor | 290/1 |
| 3,339,077 | 8/1967 | Shapiro | 290/1 |
| 3,366,865 | 1/1968 | Shapiro | 60/23 X |
| 3,403,238 | 9/1968 | Buehler et al | 60/23 X |
| 3,665,705 | 5/1972 | Christensen | 60/23 |

Primary Examiner—D. F. Duggan
Attorney—Robert M. Betz

[57] ABSTRACT

A thermal motor with an elongated housing, rotatably mounted on a transverse axis, defining a channel for reciprocating longitudinal motion within the housing of a coaxially supported bar and having a pair of parallel linearly heat-expansible bands stretched under continual tension along two opposite sides. One end of each band is fixed to the housing at each of its opposite ends and the other ends of the bands are linked respectively to the extremities of the bar, thereby interconnecting the two bands through the bar. Radiant heat is directed along the plane of rotation of the housing so that while one band is exposed to the heat the other is shielded. As the exposed band heats and expands linearly, its tension tends to decrease, while the tension in the shielded band, which is simultaneously cooling and contracting, tends to increase. The bar will shift within the housing to equalize the tension in the two bands, and the resultant unbalance in weight with respect to the transverse axis will cause the housing to rotate. The bar reverses direction every half-cycle so that the housing rotates continuously.

13 Claims, 4 Drawing Figures

Patented Aug. 21, 1973

3,754,151

THERMAL MOTOR AND GENERATOR

BACKGROUND OF THE INVENTION

1. Field of the Invention

This invention relates to thermal motors employing radiant heat as a source of power, and more particularly to motors of this type which depend for their operation on the cyclic linear thermal expansion and contraction of elements under elastic tension.

2. Description of the Prior Art

The closest prior art known to the applicant concerns devices in which the linear movement of thermally expansible elements is mechanically amplified in order to cyclically vary the radial positions of a plurality of weights relative to an axis of rotation. This type of device is exemplified by U.S. Pat. No. 2,878,641 to Decker.

In order to amplify this motion appreciably, it is necessary to transfer the motion through several interconnected linking members. The pivoted joints between any two such members or between one of the linking members and a thermally-expansible element must be provided with sufficient slack to permit variation in the relative angular position of the interconnected members. Each of these pivoted joints, therefore, represents a point in the system at which motion can be lost and additionally wherein friction may develop, thus reducing the overall efficiency of the device.

It is inherent in systems employing such mechanical linkage that the thermal expansion elements must have sufficient stiffness to exert a pushing force against members to which they are connected without buckling. This minimum thickness is proportional to the length of the elements. However, the thicker the elements become, the more time is required to heat them through, and such complete heating is necessary before the elements can expand as a unit and perform useful work.

These prior art devices generally employ independently operating mechanical linkages which shift the position of separate weights. The faster such devices rotate the greater the centrifugal force tending to move the weights radially outward from the axis of rotation regardless of whether they are heated or cooled and consequently the more this force will tend to resist the thermal expansion mechanism which seeks to cyclically unbalance the weights with respect to the axis.

Additionally, while prior art thermal motors of the type described teach the incorporation of materials with high coefficients of linear thermal expansion, insufficient attention appears to be directed to other properties which are of great importance in the design of practical thermal motors. Prominent among these are thermal conductivity, specific heat, density.

These and other aspects of the prior systems add to the complexity of and detract from the reliability of existing thermal motors which depend for their operation upon the phenomenon of linear thermal expansion.

SUMMARY OF THE INVENTION

In the light of the above, it is therefore an object of this invention to provide a radiant-energy-driven thermal motor which has few moving parts and which utilizes the alternate linear expansion and contraction of thermally responsive elements to impart rotary motion without mechanical amplification.

It is another object of the invention to provide a thermal motor in which the linearly heat-expansible elements may be made extremely thin and without stiffness strength.

It is still another object of this invention to provide a thermal motor in which the increase and decrease in tension of separate linearly heat-expansible elements cooperates within an integrated mechanical system to unbalance a weight with respect to an axis of rotation.

It is a still further object of this invention to provide a thermal motor employing a single unbalancing weight guided within a rotatable housing to enable it to move with minimum friction.

It is yet a further object of the invention to provide a thermal motor which is readily adaptable to the movement of heavy weights with consequent high torque.

These and other objects, features, and advantages will become apparent to those skilled in the art from the following detailed description when read in conjunction with the appended claims and accompanying drawing.

In accordance with one aspect of the invention, an elongated hollow housing is mounted, equidistant its ends, for rotation about a transverse axis. A bar, substantially coextensive with the housing, is supported therein so that it may move slidably in either longitudinal direction. A pair of thin, linearly heat-expansible bands extend externally along two opposite parallel sides of the housing so that the flat surfaces of the bands are normal to the plane of rotation. One end of each band is secured to the housing at its two opposite ends and the other ends of the bands are laterally interconnected with the extremities of the bar. Means are provided for subjecting the bands to continual longitudinal tensile stress within their elastic limits. The bands are selected from materials having a high coefficient of linear thermal expansion, and which maximize thermal conductivity, thermal absorptivity, and tensile strength, while minimizing specific heat and density. Preferably the bands are relatively wide to enhance the area of heat-receiving surface.

When radiant heat is directed along the plane of rotation, the flat surface of one band will be exposed to such heat while the corresponding surface of the other band will be shielded. When the exposed band becomes heated it expands linearly, tending to decrease its tension below that of the shielded band. Since the two bands are interconnected through the bar, there will be a net force causing the bar to shift in one direction to maintain the same tension in both bands. The resultant unbalance in weight with respect to the transverse axis will cause the housing to rotate. As the exposed band rotates out of the heated zone and cools, the previously shielded band is heated, causing the bar to shift in the opposite direction to again equalize the tension in the bands. Thereafter, the cyclic heating and cooling of the bands is accompanied by a reciprocating movement of the bar which produces continuous unidirectional rotation of the housing.

Additionally, in accordance with a further aspect of this invention, an electrical generator incorporating in modified form the thermal motor of this invention is presented. In this configuration, the above-described bar may be constructed of magnetized material wherein the extremities thereof are oppositely polarized, and the housing with its associated components may constitute an electrical rotor which is positioned within a stationary electrical winding such that a voltage is generated in the winding responsive to the rotation of the housing and then applied to any suitable electrical load connected to the winding.

DETAILED DESCRIPTION OF THE INVENTION

Figure 1:
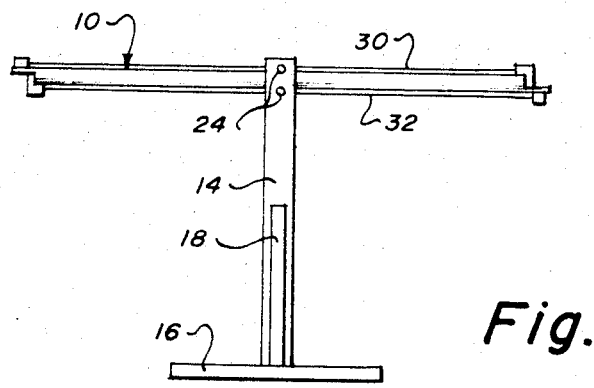
FIG. 1 is a side elevation of the complete thermal motor showing one of a pair of upright support members mounted on a base and having a housing pivotally mounted between the support members for rotation on a transverse axis in a vertical plane, and additionally showing the two linearly heat-expansible bands extending along opposite parallel sides of the housing and clamped at its ends.
Figure 2:
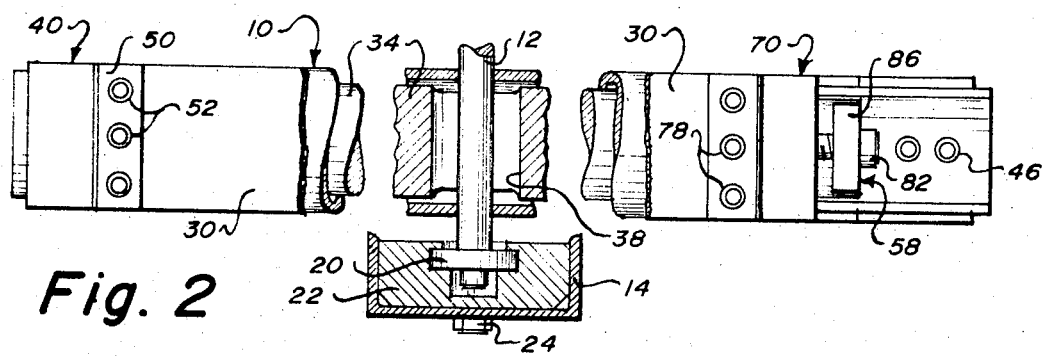
FIG. 2 is a plan view of the thermal motor, partially in section, showing the flat surface of one of the two heat-expansible bands with its supports at opposite ends of the housing, and showing the rotatable shaft passing through the longitudinally slidable bar.

With reference now to FIGS. 1 and 2 an elongated housing 10, which may conveniently be a hollow open-ended cylinder, is mounted, equidistant its ends, in fixed relation to a horizontal shaft 12, extending transversely therethrough and rotatably supported between a pair of flanged upright support members 14 which extend above a base 16 and are secured thereto by means of a pair of braces 18 disposed angularly between the upright support members 14 and the base 16.

The shaft 12 is supported at each of its ends by a suitable bearing 20 resting within a bearing support 22 mounted to the upper end of one of the upright members 14 by means of bolts 24. In order to insure that the shaft 12 is maintained in a horizontal position the bearing supports may be made longitudinally adjustable with respect to the upright support members 14 through any suitable means (not shown).

Extending externally of the housing 10, along opposite parallel sides thereof, are a pair of long, thin, linearly heat-expansible bands 30 and 32 which are substantially coextensive with the housing 10. The bands 30 and 32 are clamped at their respective ends, and subjected to adjustable tension, as will be described below, and further oriented so that their flat surfaces lie in parallel planes perpendicular to the plane of rotation of the housing 10 and are spaced apart from the adjacent surfaces of the housing 10.

An elongated bar 34 which may be of cylindrical shape, is supported within the housing 10, concentrically therewith, on a plurality of bearings 36 so that it may move longitudinally with respect to the housing with minimum friction. The bar 34 constitutes the single movable weight of the thermal motor of this invention and passes through the center of the rotational system. It will be understood that any distribution of weight along the bar 34 is permissible which is symmetric with respect to the axis of rotation. At the mid-point of the bar 34 an elongated aperture 38 extending transversely therethrough is adapted to receive the shaft 12 and permits a predetermined degree of longitudinal travel of the bar 34 in either direction.

Figure 3:
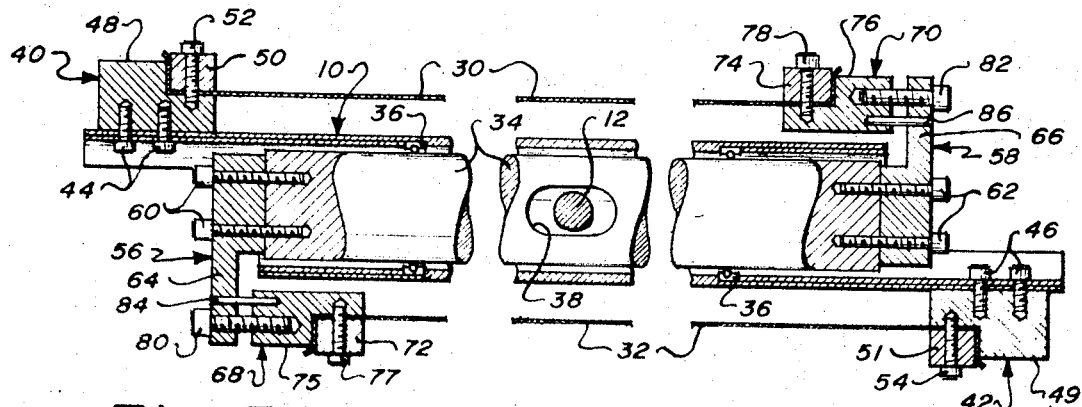
FIG. 3 is a sectional view in elevation of the thermal motor showing the two ends of the housing in greater detail, particularly the means for clamping the respective ends of the bands, the linking members connecting the bands to the extremities of the bar, and the means for adusting the tension in the bands.

With particular reference now to FIG. 3 the means for supporting the ends of the bands 30 and 32 may be examined in greater detail. At opposite ends of the housing 10 and on the two opposite parallel sides thereof a pair of similar fixed support blocks 40 and 42, which may have smooth rectangular sides, are attached to the housing by means of a plurality of screws 44 and 46 extending respectively into elements 40 and 42 from the associated inner surfaces of the housing 10. The assembly is facilitated by extending axially that portion of the surfaces of the housing 10 which interfaces with the elements 40 and 42. The surfaces 48 and 49 of the elements 40 and 42, which are normal to the plane of rotation of the housing 10, are provided with step portions to accommodate and seat the removable clamping blocks 50 and 51, which may be secured thereto through a plurality of screws 52 and 54.

Flush mounted to the two extremities of the bar 34 there are a pair of linking members 56 and 58 which are secured thereto by means of a plurality of screws 60 and 62. The linking members 56 and 58 are provided with lateral arms 64 and 66 which extend in opposite directions in the plane of rotation externally of the housing 10 and are spaced axially beyond the respective ends thereof. These arms 64 and 66 terminate laterally outward of the opposite sides of the housing 10 in generally facing relation to the support members 40 and 42.

A pair of adjustable support blocks 68 and 70 are disposed above the surface of the opposite sides of the housing 10 intermediate the arms 64 and 66 and the fixed support blocks 40 and 42, to which they are similar in size and construction. A pair of removable clamping blocks 72 and 74 may be seated against corresponding step portions on the surfaces 75 and 76 of support block 68 and 70 which are normal to the plane of rotation of the housing 10. The clamping blocks 72 and 74 may be secured to the adjustable support blocks 68 and 70 by means of clamping screws 77 and 78 extending there between. Interconnection between adjustable support blocks 68 and 70 and the arms 64 and 66 respectively is accomplished by means of tension adjusting screws 80 and 82 which are adapted to urge the adjustable support blocks 68 and 70 longitudinally with respect to the housing 10.

In assembling the motor of this invention one end of each of the bands 30 and 32 is brought into contact with the step portions of the surfaces 48 and 49. The clamping blocks 50 and 51 are then positioned over the bands 30 and 32 and tightened down by means of the screws 52 and 54 which are adapted to extend through matching holes (not shown) adjacent these ends of the bands 30 and 32 thereby securing the band 30 between the clamping block 50 and the support block 40 and the band 32 between the clamping block 51 and the support block 42. In this manner one end of each of the bands is fixed in laterally spaced relation to the surface of the housing 10 and also in fixed longitudinal in relation to the transverse axis of rotation.

In similar fashion the other ends of the bands 30 and 32 are brought into contact with the step portions of the surfaces 75 and 76 and are then secured in position by tightening down the clamping blocks 72 and 74 with screws 76 and 78 which in like manner extend through suitable holes (not shown) adjacent such other ends of the bands 30 and 32.

The adjustable support blocks 68 and 70 are now connected to the arms 64 and 66 and the bands 30 and 32 are subjected to longitudinal tensile stress by means of either of the tension adjusting screws 80 and 82. The proper amount of such tension will insure that throughout their maximum linear excursion in operation the bands 30 and 32 always remain within their elastic range below the yield point and are not allowed to assume a "slack" condition. Since the bands 30 and 32 are interconnected through the bar 34 they will both exhibit the same tension.

The tension adjusting screws 80 and 82 serve a further purpose. As the tension in the bands is increased, for example, by turning the tension adjusting screw 82 clockwise the bar 34 will tend to move slightly to the left as seen in FIG. 3. Conversely, as the tension in the bands is increased by turning the tension adjusting screw 80 clockwise the bar 34 will tend to move slightly to the right. In order to achieve an initial balance of the system it will be necessary, therefore, to adjust the setting of screws 80 and 82 such that the weight of bar 34 is precisely centered with respect to the shaft 12.

Also extending between the arms 64 and 66 and the adjustable support blocks 68 and 70 are a pair of longitudinal guide pins 84 and 86. These pins are spaced apart laterally from the tension screws 80 and 82 and serve to prevent rotation of the bands 30 and 32 about the tension screws 84 and 86 which would upset their normal relation to the plane of rotation of the housing 10.

OPERATION

In operation, the housing 10, after being initially balanced in the manner described, is subjected to a source of radiant heat such as the sun, so that a significant component of the energy from such source is directed along the plane of rotation of the motor. In this orientation, while the flat surface of one of the bands, for example band 30, is exposed to the radiant heat energy, the other, for example the band 32, is shielded therefrom. As the band 30 becomes heated it experiences linear expansion of a magnitude depending upon its particular material characteristics and dimensions. When this occurs, the tension in the band 30 tends to decrease because momentarily the distance between its supports at the ends of the housing 10 has not changed. Since the tension in the band 32 has remained the same, it now exceeds the tension in the band 30, and consequently a net force is exerted on the bar 34, causing it to shift longitudinally within the housing 10 to equalize the tension in the two bands. The distance traveled by the bar 34 will equal the linear expansion experienced by the band 30. The resultant unbalance in weight with respect to the transverse axis causes the housing 10 to rotate downward on its heavier end.

Once in a shielded position, the previously heated band 30 cools and contracts, causing the bar 34 to shift with it in the opposite direction because the tension in the band 30 now tends to increase above that of band 32. By this time the band 32 has entered the heated zone and the same process repeats except that thereafter as one band is heating, the other is cooling. It is apparent that these two effects combine to shift the bar 34 in one direction for a half-cycle of rotation of the housing end and then reverse its direction for the other half-cycle, producing continuous unidirectional rotation of the housing 10 about the axis. Obviously the shaft 12 may be mechanically interconnected with any suitable load to enable the device to accomplish useful work. It should be noted that since the bar 34 passes through the center of the rotating system, centrifugal force will not cause any undesirable shift of the weight of the bar 34.

It is necessary of course in the design of this thermal motor to provide sufficient axial spacing between each of the lateral arms 64 and 66 and the adjacent ends of the housing 10, in order that the maximum linear excursion of the bands 30 and 32 will not cause contact between such arms and the housing 10. For like reaons it is necessary to provide sufficient longitudinal clearance between the shaft 12 and the extremities of the aperture 38 in the rod 34 so that no contact is made which interferes with the travel of the rod 34. If desired, the means for supporting the housing 10 may consist of a pair of separate transverse shafts (not shown) which do not extend through the housing 10.

Within the scope of this invention, the bar 34 may be shortened with respect to the housing 10 such that the lateral arm 64 and 66 are adapted to extend to the opposite side of the housing 10 through suitable apertures in such sides intermediate the ends of the housing 10. In this configuration the non-fixed ends of the bands 30 and 32 would be positioned respectively, as before, to align laterally with the lateral arms 66 and 64.

The torque exerted by the thermal motor of this invention per half-cycle may be calculated by multiplying the increase in length experienced by either of the bands 30 or 32, as a result or radiant heating, by the weight of the bar 34. If for example the bands 30 and 32 are constructed of material having a coefficient of thermal expansion of $30 \times 10^{-6}$ inches per inch per degree Centigrade, the bands are 10 feet in length, the bar 34 weighs 50 pounds, and the temperature rise experienced by the bands during the heating process is 10° Centigrade, the torque developed will be 0.3 ft-lbs. per cycle. Practical usage of this invention envisages in one aspect thereof many thousands of these motors working together over a wide area. The above torque effects then become highly significant.

The efficiency of this thermal motor may be readily increased, within the scope of this invention, by incorporating multiple rotational elements, each employing a pair of the heat-expansible bands and a slidable bar, and mounted on a common shaft, with a predetermined angular relationship, so that the radiant energy of the sun or other source will be operating with maximum effectiveness on at least some of these rotational elements at all times.

It should also be understood that within the scope of this invention the housing 10 may be extended laterally to accommodate bands 30 and 32 of considerable width and if desired, the slidable bar may assume the form of a flat metal sheet. In this way, a linear thermal expansion of a small fraction of an inch may be made to shift a very large weight about a rotational axis and consequently to develop appreciable torque in a single device.

BAND DESIGN AND CHARACTERISTICS

The efficiency of the thermal motor of this invention depends on a number of interrelated factors. In the first place, since the linear thermal expansion experienced by the bands 30 and 32 is directly proportional to the length of these members it is advantageous to make this dimension as large as possible and also to select materials having a relatively high coefficient of linear thermal expansion, preferably at least $20 \times 10^{-6}$ inches per inch per degree Centigrade. The force available for moving the bar 34 is increased by increasing the width of the bands so as to enhance the cross-sectional area of the heat-receiving surfaces.

Since the bands 30 and 32 will not thermally expand as integral units until their temperature has been raised through their entire thickness, it is also desirable to make the bands as thin as possible, for example, on the order of a thousandth of an inch, compatible with the requisite tensile strength in their stressed condition. As a correlative attribute, the bands should have a relatively high thermal conductivity in order to further decrease the requisite heating time.

Band heating time can be still further minimized by choosing materials for bands 30 and 32 of relatively low specific heat and density and by coating them with substances such as black paint which will maximize their thermal absorptivity and radiation properties, i.e., to give them nearly perfect "black body" characteristics.

Obviously, the particular operating requirements of the thermal motor will affect the ultimate selection of band materials. However, among the most desirable from the standpoint of maximizing a substantial number of the aforementioned favorable characteristics are aluminum, copper, and magnesium alloys, the optimum constituents of which are currently under study. Because of their extremely high coefficient of linear thermal expansion, on the order of $700 \times 10^{-6}$, various types of rubbers are also being investigated for use as band materials. Although the heat conductivity of rubber is low, this may be significantly increased by including therein a dispersion of small particles of silver or other metal of high heat conductivity. Also within the scope of this invention various plastics and ceramics possess a desirable mix of the characteristics referenced here.

Figure 4:
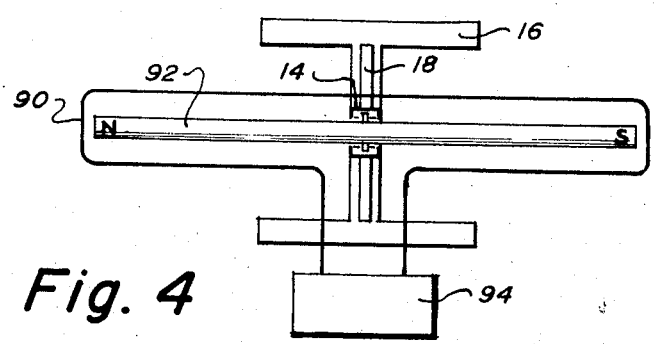
FIG. 4 is a plan view of an electrical generator incorporating the housing and associated structures of this invention wherein the housing constitutes a rotor and is positioned within a stationary electrical winding.

A modification of this invention comprehends an electric generator basically illustrated in FIG. 4. In this configuration, the housing 10 with its associated components as described above, is positioned within a stationary electrical winding 90 having a plurality of turns surrounding the housing 10. The bar 34 is replaced by a magnetized bar 92 of similar shape and function, the extremities of which are oppositely polarized. Otherwise the components of the thermal engine as described above are the same. In this manner the housing 10 is adapted to constitute the rotor of the electrical generator. The housing 10 is oriented properly so that when it rotates responsive to the presence of radiant heat it induces in the stationary winding 90 a voltage proportional to the number of turns therein which may be applied to any suitable load 94.

The foregoing disclosure and description of the invention is illustrative and explanatory thereof and various changes in the size, shape and material constituents as well as the details of the illustrated construction may be made within the scope of the appended claims without departing from the spirit of the invention.

What is claimed is:

1. A radiant heat driven thermal motor comprising:
   a. an elongated hollow housing having at least two opposite parallel sides;
   b. means for supporting the housing equidistant its ends for rotation about a transverse axis;
   c. a bar, substantially coextensive with the housing, slidably supported therein for reciprocal longitudinal movement;
   d. a pair of linearly heat-expansible bands extending externally along the opposite sides of the housing such that the flat surfaces of the bands are normal to the plane of rotation;
   e. means for securing one end of each of the bands to the housing at its opposite ends respectively;
   f. means for laterally interconnecting the other ends of the bands respectively with the extremities of the bar; and
   g. means for subjecting the bands to continual longitudinal tensile stress within their elastic limits.

2. A thermal motor according to claim 1 wherein the housing comprises an elongated hollow cylinder.

3. A thermal motor according to claim 2 wherein the bar is cylindrical and concentrically supported within the cylinder on low friction bearings.

4. A thermal motor according to claim 1 wherein the means for supporting the one end of each of the bands comprises a pair of fixed support blocks attached to opposite ends of the housing respectively on the opposite sides thereof and there adapted to support the one end of each of the bands in laterally spaced relation to the surface of the housing and means for securing the one end of each of the bands respectively to the pair of fixed support blocks.

5. A thermal motor according to claim 1 wherein the means for lateral interconnection between the other ends of the bands and the bar comprises a pair of linking members affixed respectively to the extremities of the bar and provided respectively with a pair of lateral arms extending in opposite directions in the plane of rotation, externally of the housing, in axially spaced relation thereto, and terminating laterally outward of the opposite sides of the housing, and means for securing the other ends of the bands respectively in adjustable longitudinal relation to the lateral arms.

6. A thermal motor according to claim 5 including a pair of adjustable support blocks positioned respectively intermediate the lateral arms and the fixed support blocks, a pair of tension adjusting screws longitudinally interconnecting the lateral arms and the pair of adjustable support blocks and adapted to urge the adjustable support blocks longitudinally with respect to the housing, and means for securing the other end of each of the bands respectively to the adjustable support blocks such that the bands are parallel to the opposite sides of the housing.

7. A thermal motor according to claim 6 additionally including a pair of guide pins respectively extending longitudinally between the lateral arms and the pair of adjustable support blocks in spaced relation to the pair of tension adjusting screws, thereby preventing rotation of the bands about the tension adjusting screws.

8. A thermal motor according to claim 1 wherein each of the bands consists of a material having a coefficient of linear thermal expansion of at least $20 \times 10^{-6}$ inches per inch per degree Centigrade.

9. A thermal motor according to claim 1 wherein each of the bands consists of a thin sheet of an aluminum alloy.

10. A thermal motor according to claim 1 wherein each of the bands consists of a thin sheet of a copper alloy.

11. A thermal motor according to claim 1 wherein each of the bands consists of a thin sheet of a magnesium alloy.

12. A thermal motor according to claim 1 wherein each of the bands consists of rubber containing a dispersion of silver particles.

13. An electrical generator comprising:
 a. a stationary electrical winding having a plurality of turns;
 b. a rotor surrounded by the winding and consisting of
  1. an elongated housing having at least two opposite parallel sides;
  2. means for supporting of the housing equidistant its ends for rotation about a transverse axis;
  3. a bar, substantially coextensive with the housing, slidably supported therein for reciprocal longitudinal movement, the bar being composed of magnetized material and the extremities thereof being oppositely polarized;
  4. a pair of parallel linearly heat-expansible bands extending externally along the opposite sides of the housing such that the flat surfaces of the bands are normal to the plane of rotation;
  5. means for securing one end of each of the bands to the housing at its opposite ends respectively;
  6. means for laterally interconnecting the other ends of the bands respectively with the extremities of the bar; and
  7. means for subjecting the bands to continual longitudinal tensile stress within their elastic limits.
 c. the rotor being thereby adapted to induce a voltage in the winding proportional to the number of turns therein.

* * * * *